Dec. 15, 1964  W. D. SCHAEFFER  3,161,694
CLATHRATION PROCESS
Filed April 17, 1961

INVENTOR.
WILLIAM D. SCHAEFFER
BY John H. Crowe
AGENT

3,161,694
CLATHRATION PROCESS
William D. Schaeffer, Pomona, Calif., assignor to Union Oil Company of California, Los Angeles, Calif., a corporation of California
Filed Apr. 17, 1961, Ser. No. 103,625
20 Claims. (Cl. 260—674)

This invention relates to a method for separating difficultly separable compounds such as isomers or the like by selective clathration, and particularly to the preparation of stable solutions for use in such selective clathration processes.

In one sense, the present invention can be viewed as an improvement in those clathration systems which employ aqueous alkaline solvent media in the clathration and/or declathration steps, and especially wherein liquid-liquid phase separations are relied upon for recovering the clathrated and nonclathrated feed components from the aqueous alkaline media. Three such clathration systems are described in my copending U.S. applications Serial No. 862,223, filed December 28, 1959 and maturing into U.S. Patent No. 3,043,892 on July 10, 1962; Serial No. 3,058, filed January 18, 1960 and maturing into U.S. Patent No. 3,049,575 on August 14, 1962; and Serial No. 26,489, filed May 3, 1960 and maturing into U.S. Patent No. 3,029,300 on April 10, 1962.

One of the preferred Werner complexes for use in the processes of said copending applications is nickel tetra(4-methylpyridine)dithiocyanate for reasons made clear in those applications. Hereinafter, for simplicity's sake and in accordance with customary practice in the industry, 4-methylpyridine will be abbreviated as 4MP, and nickel tetra(4-methylpyridine)dithiocyanate will be identified as $Ni(4MP)_4(SCN)_2$. I shall also refer to the two portions of the Werner complex as the Werner amine (such as 4MP) and the Werner salt (such as $Ni(SCN)_2$). In the clathration process the Werner complex is preferably used as a solution in a primary solvent, which in the case of the above patent applications consists essentially of water, an alkali such as ammonia or an alkanolamine, and, in some instances, a buffer salt such as an ammonium salt.

The invention is of particular utility for clathration processes using clathration solutions in which the Werner salt is $Ni(SCN)_2$, the Werner amine is 4MP, the alkali is ethanolamine (MEA) and the buffer salt is ethanolammonium thiocyanate (MEA·HSCN) and for purposes of clarity and simplicity of explanation it will first be considered here in such limited form. However, as will be made clear hereinafter, the method is substantially broader than this with respect to operable classes of Werner complexes, aqueous alkaline solutions and buffer salts.

A preferred Werner complex solution within the scope of this invention comprises a 25 percent solution of $Ni(4MP)_4(SCN)_2$ in a primary solvent of the following composition:

| Component: | Weight percent |
|---|---|
| Water | 45 |
| Ethanolamine | 38 |
| Ethanolammonium thiocyanate | 17 |
| | 100 |

Nickelous thiocyanate is not commercially available as such and heretofore it has been the practice to prepare solutions of $Ni(4MP)_4(SCN)_2$ by preparing the Werner complex in a separate operation, then air drying it and adding it to a suitable primary solvent. The conventional method of preparing $Ni(4MP)_4(SCN)_2$, prior to my invention, was to add 4-methylpyridine to an aqueous solution of nickelous sulfate and ammonium thiocyanate. This technique yields the water insoluble complex as a hydrous precipitate containing 30 to 50 weight percent water. Customarily, this hydrous compound has been air dried before use as a clathrate former in Werner complex solutions. The overall reaction of this process of Werner complex formation is illustrated by the following formula:

$$NiSO_4 + 2NH_4SCN + 4(4MP) \rightarrow Ni(4MP)_4(SCN)_2 + (NH_4)_2SO_4$$

In isolating and air drying $Ni(4MP)_4(SCN)_2$ prepared according to the above-described method, some of the 4-methylpyridine is invariably lost from the complex. Furthermore, the final product is contaminated with $(NH_4)_2SO_4$, the by-product of the subject method of synthesis, which cannot be completely washed out.

In accordance with this invention the Werner complex solution is prepared by first preparing a solution, stable to storage, of nickelous thiocyanate and alkanolammonium thiocyanate, such as, for example, ethanolammonium thiocyanate, useful as an intermediate in the preparation of Werner complex solutions such as those described above. The solution of nickelous thiaocyanate and alkanolamminoum thiocyanate can be readily converted to a Werner complex solution suitable for clathration purposes by adding a Werner amine, such as 4-methylpyridine, thereto, along with any additional solvent ingredients which might be required to adjust the final solution to a desired composition.

It will be readily apparent to those skilled in the art that the preparation of a Werner complex clathration solution from the nickelous thiocyanate-alkanolammonium thiocyanate solution of this invention affords a simple and practical means of obtaining such mixtures free of contaminating ammonium and sulfate ions. Furthermore, the preparation of Werner complex solutions in this manner completely avoids the intermediate steps of isolating and drying solid Werner complexes (and the attendant loss of Werner amine) essential to the method of preparation heretofore employed.

I have made the unexpected discovery that the use of Werner complex solutions prepared by the method taught herein for clathration purposes results in a substantial increase in separation efficiency over the use of comparative Werner complex solutions made by the previously used technique.

It is thus a principal object of my invention to provide an in situ method of preparing a solution of a Werner complex in a primary solvent which avoids the necessity of having to separately synthesize the Werner complex and primary solvent.

It is another object of the invention to provide a method of preparing a solution of a Werner complex in a primary solvent free of extraneous ions.

Still another object of the invention is to provide a method of preparing a solution of a Werner complex in a primary solvent comprising an aqueous alkanolamine solution containing a dissolved alkanolammonium salt of the anion of the Werner salt whereby said alkanolammonium salt and said Werner salt are produced as co-products in the same solution.

It is a more specific object of my invention to provide a method of preparing a solution of the Werner complex $Ni(4MP)_4(SCN)_2$ in a primary solvent consisting of an alkanolamine having nickelous thiocyanate dissolved therein by means of which the Werner salt is intermediately synthesized in such manner as to be free of extraneous ions such as ammonium and sulfate ions.

It is another object of the invention to prepare a Werner complex solution which when used for clathration purposes exhibits a substantial increase in separation efficiency over that of any such solution made by previously known methods.

Other objects and features of this invention will be readily apparent to those skilled in the art from the complete description thereof which follows.

Reference is now made to the accompanying drawings which illustrate in flowsheet form the basic steps of the preparation of a Werner complex solution according to the method of my invention and a generalized method of clathration utilizing said Werner complex solution.

Figure 1:
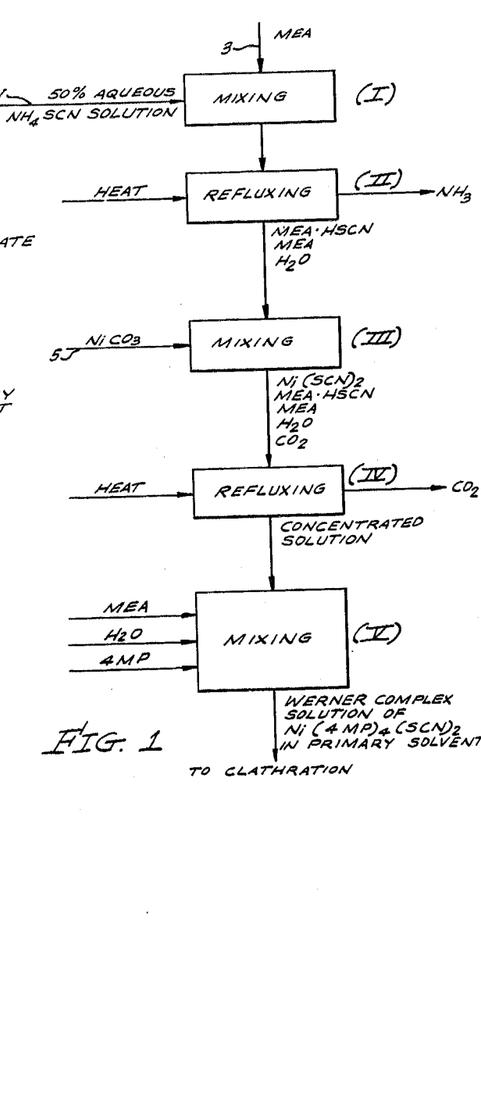

Turning first to FIGURE 1, which is a diagrammatic representation of the preparation of a Werner complex solution by means taught herein, step (I) shows the mixing of an aqueous solution of ammonium thiocyanate and ethanolamine. For purposes of brevity, ethanolamine is abbreviated as MEA (for monoethanolamine) on FIGURE 1. While FIGURE 1 is limited to the use of particular ingredients, the invention is not restricted to these materials but is broad enough to encompass many other ingredients equivalent thereto for my purpose. The aqueous ammonium thiocyanate solution is introduced to step (I) through line 1, in the form of a solution of 50 percent concentration, and the MEA is introduced through line 3 as shown. The mixing of the MEA and ammonium thiocyanate in solution brings about the following reaction:

$$HOCH_2CH_2NH_2 + NH_4SCN \rightarrow HOCH_2CH_2NH_3SCN + NH_3$$

For reasons which will be explained hereinafter, an excess of MEA, over the stoichiometric quantity required to react with the ammonium thiocyanate present, is employed in the FIGURE 1 procedure.

The step (I) mixing operation is performed at room temperature and the ammonia formed as a result of the reaction between the ammonium thiocyanate and the MEA remains in solution as long as the temperature stays at that level. Accordingly, after mixing step (I) has been completed, the resulting solution is heated and subjected to refluxing step (II) to drive off the ammonia as a vapor. As indicated previously, the presence of ammonium ions is undesirable in Werner complex solutions intended for clathration purposes and since ammonia is quite volatile at elevated temperatures, refluxing affords a convenient and practical means of removing it from the solution.

After refluxing step (II) has been completed, the solution consists of dissolved ethanolammonium thiocyanate (abbreviated on FIGURE 1 as MEA·HSCN), MEA and water. Into this solution there is mixed a quantity of $NiCO_3$ (introduced through line 5) as shown in step (III) on the drawing. The $NiCO_3$ reacts with the MEA·HSCN to form $Ni(SCN)_2$. The reaction may be illustrated by the following equation:

$$2HOCH_2CH_2NH_3SCN + NiCO_3 \rightarrow 2HOCH_2CH_2NH_2 + Ni(SCN)_2 + H_2O + CO_2$$

For reasons given below, the quantity of $NiCO_3$ introduced into the solution in step (III) is less than the stoichiometric quantity required for complete reaction with the ethanolammonium thiocyanate (MEA·HSCN) present.

It is desirable to eliminate $CO_2$ from the solution since it is present only as a contaminant which can cause future difficulty if not removed. To accomplish such elimination of $CO_2$ the solution from mixing step (III) is heated and refluxed, as shown at step (IV). The solution from step (IV) is normally a concentrated mixture of $Ni(SCN)_2$, MEA·HSCN, MEA and water which can be stored until needed for the next step of the process.

The solution from step (IV), which normally requires the addition of more water and ethanolamine at this stage of the process is mixed with the necessary quantities of those components and the necessary amount of 4-methylpyridine to form a Werner complex mixture having a desired ratio of Werner complex $$[Ni(4MP)_4(SCN)_2]$$

to primary solvent, the primary solvent consisting of a solution of ethanolammonium thiocyanate in a mixture of ethanolamine and water. The mixing of the 4-methylpyridine, and other components as needed, into the solution from step (IV) is shown as step (V) on FIGURE 1. The mixture obtained from step (V) is a Werner complex solution suitable for use in clathration processes for the separation of difficulty separable compounds.

My method is not limited to the particular embodiment shown on FIGURE 1 insofar as steps (IV) and (V) are concerned. One possible alternative procedure, where the solution from step (IV) is a concentrated mixture as is normally the case, is to add all of the MEA and water required for assurance of desired concentration levels in the final Werner complex solution to said mixture prior to the addition of 4-methylpyridine thereto. The solution from the step (IV) refluxing operation is stable to storage whether or not it is mixed with additional water and MEA and thus where immediate conversion of that material to a Werner complex solution is not contemplated it can be stored either in its concentrated form or in a more diluted form, until needed for such purpose.

Figure 2:
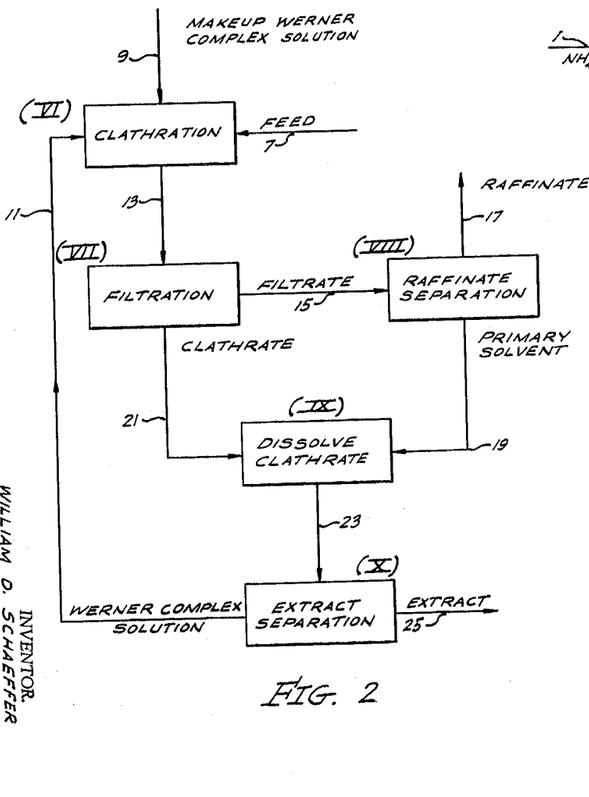

Turning next to FIGURE 2, this drawing shows a flow diagram illustration of the use of a Werner complex solution made by the method of this invention, for clathration purposes.

In the clathration step (VI) the feed to be resolved is introduced through line 7 and makeup Werner complex solution prepared by the method shown in FIGURE 1 is introduced through line 9. The bulk of the Werner complex solution employed is recycled to clathration step (VI) through line 11.

Clathration is effected in step (VI) by agitating the mixture, and reducing the temperature to cause precipitation of the solid clathrate. It is ordinarily preferred to effect the clathration at moderate temperatures from about $-10°$ to about $70°$ C., and preferably between about $0°$ and $50°$ C. The solid clathrate contains the more readily clathrated components of the feed mixture, while the less readily clathratable components will remain dissolved or dispersed in the primary solvent phase. The resulting slurry is then transferred via line 13 to filtration step (VII) for purposes of separating the liquid phase from the crystalline solid phase. Other means for separating liquid phases from solid phases such as, for example, settling or centrifuging may be used, if desired, in place of the filtration step.

The resulting liquid phase filtrate is then transferred via line 15 to raffinate separation step (VIII) where the non-clathrated portion of the feed is allowed to stratify and separate. The raffinate phase of non-clathrated feed components is then withdrawn via line 17. The stripped primary solvent phase from step (VIII) is then transferred via line 19 to clathrate dissolving step (IX) to which the solid clathrate from filtration step (VII) is also transferred, via line 21. There is normally dissolved in the filtrate from filtration step (VII) a small amount of the Werner amine (the heterocyclic nitrogen base from the Werner complex). In order to recover this Werner amine for reuse in the system, various recovery techniques have been integrated with raffinate separation step (VIII). In this connection it is known to employ a secondary solvent which preferentially dissolves the non-clathratable feed components and the Werner amine from the filtrate, or an organic acid such as succinic acid, in such fashion as to effect a recovery of the Werner amine. Methods of so using these materials will be discussed in greater detail hereinafter.

In clathrate dissolving step (IX), the solid clathrate is redissolved in the primary solvent phase by raising the temperature a suitable amount such as, for example, from about 50° to about 80° C. Upon dissolution of the clathrate, the clathrated component of the feed normally forms a separate liquid phase. This two-phase mixture is then transferred via line 23 to extract separation step (X), wherein the formerly clathrated feed components are separated by settling and decanting or any other desired method. Here again, as in the case of raffinate separation step (VIII), additional means such as those employing a secondary solvent or an organic acid may be used in conjunction with or as a part of step (X) for recovery of Werner amine (heterocyclic nitrogen base) dissolved in the extract product. The extract mixture of clathrated feed components is removed via line 25 as one product of the clathration separation operation (the other product being the raffinate removed from raffinate separation step (VIII) via line 17), and the Werner complex solution phase from extract separation step (X) is recycled through line 11 to clathration step (VI).

The Werner complexes prepared in solution according to my novel method are made up of at least three components. The fundamental unit is a Werner salt, this being a salt of a metal having an atomic number above 12 which is capable of forming coordinate complexes of the Werner type. I have observed that divalent metals having incompletely filled 3d or 4d electron shells are particularly amenable to Werner complex formation. Examples of some metals fitting this description are manganese, iron, cobalt, nickel, palladium and platinum, of which the first four are preferred because of their good performance characteristics, relatively low cost and ready availability.

The anion of the Werner salt may comprise any suitable negative radical, such for example as thiocyanate, isothiocyanate, azide, cyanate, isocyanate, cyanide, sulfate, nitrate, nitrite, chloride, bromide, iodide, phosphate, formate, acetate, and the like. A group of negative radicals found to be particularly effective for the present purposes consists of the monovalent anions, particularly the thiocyanate, isothiocyanate, azide, cyanate, isocyanate and cyanide radicals. However, any anion may be utilized, the salts of which are capable of producing crystalline Werner complexes by coordinate bonding to the Werner amines hereinafter described. Such complexes are described generally in Modern Aspects of Inorganic Chemistry, Emelius and Anderson, 79–189, Van Nostrand Co., 1946, and also in Textbook of Inorganic Chemistry, vol. X, M. M. J. Sutherland, J. P. Lippincott Co., 1928.

The second major component of the Werner complexes consists of one or more of the Werner amines. Werner amines, as that term is employed herein, are normally heterocyclic nitrogen bases which are bound to the central metal atom of the Werner complex through coordinate bonds. The operative complexes are mainly of the tetra- and hexa-coordinate types, wherein the metal atom is coordinated with four or six atoms of basic nitrogen. The nitrogen base should be selected so as to give a maximum selective absorption for the particular compound which is to be absorbed into the crystal lattice of the complex. For example, if it is desired to absorb p-xylene, a very suitable nitrogen base is 4-methylpyridine. Not all nitrogen bases are equally effective in forming complexes which will absorb the desired component. For example, the 3-methylpyridine complex with nickel thiocyanate is not as effective as the 4-methylpyridine complex for absorbing p-xylene, presumably because of the stearic effects of the 3-methyl group. However, the 3-methylpyridine complex may be used advantageously for absorbing other compounds. The nitrogen bases should therefore be selected by a judicious combination of theoretical reasoning and actual testing of the complexes with the particular mixture to be separated. The overall molecular dimensions of the nitrogen base should preferably approximate the overall molecular size of the compound to be absorbed in the complex.

In general, any heterocyclic nitrogen base may be employed which is sufficiently basic to form coordinate complexes with the above-described salts. This includes monocyclic and polycyclic compounds, wherein at least one of the heterocycles contains from one to three hetero-N atoms. In over-all size, the nitrogen base may contain from three to about thirty carbon atoms, preferably from four to fifteen. Interfering functional groups such as —COOH should be absent, but other more neutral, relatively non-coordinating functional groups may be present such as halogen, hydroxyl, nitro, alkoxy, aryloxy, amino, cyano, carboalkoxy, alkanoyl, acetyl, etc., provided such functional groups are compatible with any functional groups present in the mixture of compounds to be separated. Examples of suitable bases include pyridine, substituted pyridines, substituted pyrroles, piperidines, substituted piperidines, and the like.

A particularly preferred class of organic bases are the heterocyclic, resonance-stabilized bases which contain one to three, but preferably one, hetero-N atoms. Suitable examples are pyridine, the picolines, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4-disubstituted pyridines. These compounds are sufficiently strong bases to form relatively stable Werner complexes, and the resulting complexes are capable of selectively forming clathrates stable at room temperatures with a wide variety of aromatic compounds. Suitable substituted pyridines comprise the following:

4-methylpyridine
4-ethylpyridine
4-n-propylpyridine
4-isopropylpyridine
4-n-butylpyridine
4-n-hexylpyridine
4-vinylpyridine
4-fluoropyridine
4-chloropyridine
4-bromopyridine
4-hydroxypyridine
4-hydroxymethylpyridine
4-methoxypyridine
4-aminopyridine
Methylisonicotinate
4-cyanopyridine
4-acetylpyridine
4-chloromethylpyridine
3-methylpyridine
3-ethylpyridine
3-n-propylpyridine
3-isopropylpyridine
3-n-butylpyridine
3-vinylpyridine
3-chloropyridine
3-hydroxypyridine
3-methoxypyridine
3-acetylpyridine
3-cyanopyridine
Ethyl nicotinate
3,4-dimethylpyridine
3,4-diethylpyridine
3-methyl, 4-ethylpyridine
4-methyl, 3-ethylpyridine
4-methyl, 3-n-hexylpyridine
4-methyl, 3-cyanopyridine
4-chloro, 3-methylpyridine
4-acetyl, 3-methylpyridine
4-methoxy, 3-ethylpyridine
Isoquinoline While, as indicated above, the Werner amines suitable for use in the preparation of Werner complexes within the scope of this invention are normally heterocyclic nitrogen bases, it is not essential that this be the case and other nitrogen bases known to form Werner complexes suitable for purposes of my invention can be used in lieu of said heterocyclic bases if desired. Particularly exemplary of nitrogen bases, other than heterocyclic bases, suitable for such purposes, are the substituted primary benzylamines having one or the other of the following general formulas:

wherein $R_1$ is a primary alkyl group, $R_2$ is H or a primary alkyl group and $R_3$ is a neutral, relatively non-coordinating functional group such as alkyl, halogen, hydroxyl, nitro, alkoxy, aryloxy, cyano, carboalkoxy, alkanoyl, acetyl, etc., which is compatible with any functional groups present in the mixture of compounds to be separated by the particular Werner complex under consideration; $R_3$ may be either polar or not and it can be located on the ortho, meta or para position of the benzene ring.

Some typical compounds fitting the above description are:

α-Methylbenzylamine
α-Ethylbenzylamine
α-Propylbenzylamine
α-Butylbenzylamine
α-Isobutylbenzylamine
α-Amylbenzylamine
α-Hexylbenzylamine
α-Octylbenzylamine
α-Methyl-p-methylbenzylamine
α-Methyl-o-methylbenzylamine
α-Methyl-p-ethylbenzylamine
α-Methyl-p-isopropylbenzylamine
α-Methyl-p-t-butylbenzylamine
α-Methyl-p-methoxybenzylamine
α-Methyl-p-fluorobenzylamine
α-Methyl-p-chlorobenzylamine
α-Methyl-o-chlorobenzylamine
α-Methyl-p-bromobenzylamine
α-Methyl-p-iodobenzylamine
α-Methyl-m-nitrobenzylamine
α-Propyl-p-methylbenzylamine
α-Propyl-p-bromobenzylamine
α-Isobutyl-p-bromobenzylamine
α-Methyl-p-cyclohexylbenzylamine
p-Methylbenzylamine
p-Bromobenzylamine
p-Dimethylaminobenzylamine Many other similar examples of suitable Werner amines could be cited, as will be apparent to those skilled in the art, and the complexes may include only one such amine, or a mixture of two or more may be employed, in which case a mixed complex is formed.

The preferred Werner complexes of monovalent anion salts of this invention may be designated by the following general formula:

$$[A_nX \cdot Z_y]$$

wherein X is the metal atom as above defined, Z is the Werner amine, A is the anion as above defined, y is a number from 2 to 6, and n is a number from 1 to 3.

Examples of suitable complexes which may be employed are as follows:

[Ni(4MP)$_4$(SCN)$_2$]
[Cu(4MP)$_4$(SCN)$_2$]
[Hg(4MP)$_4$(NNN)$_2$]
[Ni(1-hexylamine)$_6$(SCN)$_2$]
[Co(pyridine)$_4$(OCN)$_2$]
[Cd(4MP)$_4$(CN)$_2$]
[Ag(4MP)$_2$(NNN)]
[Cr(pyridine)$_4$SO$_4$]
[Ti(isoquinoline)$_3$(NH$_3$)$_3$(C$_2$O$_4$)$_2$]
[Ni(4MP)$_4$Cl$_2$]
[Ni(4MP)$_4$(N$_3$)$_2$]
[Ni(4-n-propylpyridine)$_4$(SCN)$_2$]
[Ni(isoquinoline)$_4$Cl$_2$]
[Ni(4MP)$_4$Br$_2$]
[Mn(4MP)$_4$(SCN)$_2$]
[Mn(isoquinoline)$_4$(SCN)$_2$]
[Zn(4MP)$_4$Cl$_2$]

Obviously many other complexes similar to the above could be employed, not all of which would give optimum separation of all mixtures but which should be selected to meet the specific peculiarities of the mixture concerned.

The primary solvents employed herein contain water plus any suitable water-soluble organic or inorganic nitrogen base which is more strongly basic than the Werner amine. The ratio of nitrogen base to water will vary widely depending upon the Werner complex used and the particular nitrogen base. Generally, the primary solvent will contain between about 10% and 90% by weight of nitrogen base. The ratio should be such as to provide the desired differential solubility of Werner complex therein, at the respective clathration and declathration temperatures. When using ammonia, suitable concentrations may range between about 10% and 30% by weight in the declathration step and about 0% to 20% in the clathration step. Operative concentrations of ethanolamine ($NH_2CH_2CH_2OH$) may range between about 10% and 70% by weight in both stages. In all cases, it is preferred to use sufficient water to render the feed mixture substantially insoluble in the primary solvent.

Other alkanolamines which may be used in place of mono-ethanolamine include for example, diethanolamine; triethanolamine; 2-amino-n-butanol; 2-amino-2-methyl-1-propanol; 2-(methylamino)ethanol; 2-(ethylamino)ethanol; 2-amino-2-ethyl-1,3-propanediol; 2-amino-2-methyl-1,3-propanediol; and the like. In general any lower alkanolamine containing from two to about ten carbon atoms, from one to three amino groups, and from one to three hydroxyl groups may be employed, including primary, secondary, and tertiary amines. The operative ratios of alkanolamine in the primary solvent may vary widely, e.g., from about 2 percent to 75 percent by weight. Preferred ratios generally fall within the range from about 10 percent to about 70 percent. The greater the concentration of alkanolamine in the solvent, the greater will be the solubility of Werner complex and feed mixture therein.

Other volatile bases (boiling below water) which may be used in place of ammonia include for example, methylamine, dimethylamine, trimethylamine, methyl-ethylamine, ethylamine, diethylamine, triethylamine, n-propylamine, isopropylamine, n-butylamine, isobutylamine, isoamylamine, and the like.

In general, any water-soluble nitrogen base having a dissociation constant greater than about $10^{-6}$, and greater than the dissociation constant of the Werner amine, may be used as the alkaline component of the primary solvent.

The operating class of ammonium salts which may be used herein includes substituted, as well as unsubstituted, ammonium salts. Suitable ammonium salts are ammonium thiocyanate, ammonium chloride, ammonium sulfate, ammonium nitrate, ammonium acetate, ammonium citrate, ammonium oxalate, ammonium glycolate, ammonium succinate, and the like. Suitable substituted ammonium salts include methyl ammonium thiocyanate, dimethyl ammonium thiocyanate, ethyl ammonium chloride, ethyl ammonium sulfate, ethanolammonium thiocyanate, ethanolammonium chloride, ethanolammonium sulfate, ethanolammonium cyanate, ethanolammonium cyanide, diethanolammonium thiocyanate, ethanolammonium acetate, and the like. These salts may be used in proportions ranging between about 1% and 40% by weight of the primary solvent, depending upon relative solubilities. Any amounts are effective in some degree, and the preferred proportions generally range between about 15% and 30% by weight.

As previously indicated, it is preferred to use an ammonium salt, the anion of which is the same as the anion of the Werner salt. Since the preferred Werner salts are the thiocyanates, it is therefore preferred to use ammonium thiocyanates. It is further preferred to use an ammonium salt of the same nitrogen base as that used in the primary solvent. Thus, where ethanolamine is used in the primary solvent, the preferred salt would be ethanolammonium thiocyanate.

The Werner complex solutions prepared by the method of my invention have particular utility in clathration procedures for separating feed mixtures of difficultly separable compounds such as, for example, mixtures of xylene isomers, one such procedure being depicted in generalized form on FIGURE 2. As explained above in the description of that figure, various techniques have been proposed either as a part of or in conjunction with raffinate separation step (VIII) in order to effect a recovery of dissolved Werner amine in the mixture. For example, a secondary solvent can be added at this point to preferentially dissolve the non-clathratable feed components and Werner amine material present in the filtrate from step (VII). Where the feed mixture is composed of aromatic hydrocarbons, the secondary solvent can be a paraffinic or naphthenic hydrocarbon such as pentane, heptane, octane, nonane, or mixed hydrocarbons such as alkylate fractions. The solution of non-clathrated feed components in the secondary solvent is then withdrawn from the system and sent to a secondary solvent recovery step, which may be for example, a fractional distillation operation wherein secondary solvent plus any dissolved Werner amine is distilled overhead and the non-clathrated feed components are recovered as bottoms. The secondary solvent-Werner amine overhead product can be recirculated to admixture with new filtrate going to raffinate separation step (VIII).

A secondary solvent technique can also be incorporated into extract separation step (X) of FIGURE 2 if desired. Thus such a secondary solvent can be added at this point after which the solution of clathrated feed components in the secondary solvent is removed and sent to a secondary solvent recovery step, which again may be a fractional distillation, wherein secondary solvent plus dissolved Werner amine is distilled as an overhead which may, if desired, be recycled to the system, and the formerly clathrated components are recovered as a bottoms product. For a more detailed description of the use of a secondary solvent for the purposes indicated above, see my co-pending U.S. patent application Serial No. 26,489, filed May 3, 1960 and maturing to U.S. Patent No. 3,029,300.

Another technique for the recovery of Werner amine from clathration process product streams such as the filtrate stream from filtration step (VII) and the extract phase from step (IX) of FIGURE 2 employs an aqueous acid solvent, such as aqueous succinic acid, to accomplish this purpose. A detailed description of this particular technique can be found in my co-pending U.S. patent application Serial No. 65,641, filed October 28, 1960.

A wide variety of feed mixtures can be resolved by the clathration method described above. Said method is operative for separating substantially any mixture of organic compounds wherein the components differ in molecular configuration, and wherein at least one component is substantially aromatic in character. By "substantially aromatic" is meant that at least about 20 percent of the carbon atoms in the molecules to be clathrated are present as structural units of an aromatic ring, the term "aromatic" having the meaning hereinafter specified. Any remaining carbon atoms may be present as saturated or unsaturated aliphatic side-chains, or saturated or unsaturated non-aromataic ring systems. Such compounds may contain a total of from 4 to 60, and preferably from 6 to 20, carbon atoms.

A difference in "molecular configuration," as referred to herein, means a difference in molecular size or shape as a result of differences in (1) the number of atoms per molecule, and/or (2) the arrangement of atoms within the respective molecules, and/or (3) the size of the atoms present in the respective molecules.

Any number and type of functional groups may be present in the feed components, provided that such groups are compatible with the Werner complex employed, i.e., that such groups do not change the chemical character of the Werner complex. Generally excluded are those compounds which are either so acidic as to decompose the Werner complex, or so basic as to displace the Werner amine from the Werner complex. When the compounds are too acidic or too basic, it is feasible to prepare neutral derivatives of such compounds, e.g., salts, esters, ethers, amides, etc., and then effect separation of the neutral derivatives.

Whenever any mixture of compounds is so incompatible with the Werner complex that the normal clathration procedures herein described result primarily in chemical decomposition, change, or disruption of the Werner complex, as opposed to the desired clathration, the contacting of such mixtures with the Werner complex is by definition excluded from the term "clathration" as used herein and in the claims. Functional groups which generally do not disrupt the normal clathration reaction, and may hence be present in the feed components are as follows: —F, —Cl, —Br, —I, —NO$_2$, aryl-NH$_2$, —OR, alkyl-OH, aralkyl-OH, =CO, —CHO, —CN, —COOR, —COR, —COO-metal, —SR, —CONH$_2$, wherein R is a hydrocarbon radical. Many groups which are generally, though not always, disruptive and to be avoided are —SH, aryl-OH, —COOH, alkyl-NH$_2$, aralkyl-NH$_2$, and the like, unless they are first converted to more nearly neutral derivatives.

Feed mixtures which lend themselves particularly well to separation by the clathration procedure described above are xylene mixtures such as those containing as typical ingredients p-xylene, m-xylene, o-xylene and ethylbenzene. My preferred Werner complex solution previously identified as a 25 percent solution of $$Ni(4MP)_4(SCN)_2$$

in a primary solvent of water, ethanolamine and ethanolammonium thiocyanate in specified proportions has been found to be of great usefulness for the separation of these xylene mixtures. For examples of many other specific mixtures which are separable by the clathration method of this invention see my co-pending U.S. application Serial No. 26,489, now U.S. Patent No. 3,029,300.

In the description of FIGURE 1, the first step was described as that of mixing an aqueous solution of ammonium thiocyanate with ethanolamine. As indicated previously the method is not limited to the use of these ingredients and any suitable water-soluble nitrogen base, such as, for example, any suitable alkanolamine, can be used in place of the ethanolamine if desired. Also, any aqueous solution of an ammonium salt of an anion capable of forming a salt with a metal having an atomic number above 12, and of such nature that its salt with said metal is capable of forming relatively water-insoluble Werner complexes with Werner amines, can be employed in place of the aqueous ammonium thiocyanate solution if desired. The ammonium salt is preferably an unsubstituted ammonium salt such as ammonium thiocyanate but it can also be a substituted ammonium salt such as, for example, ethanolammonium thiocyanate.

In place of the nickel carbonate any salt of a metal having an atomic number above 12, which metal is capable of forming relatively water-insoluble Werner complexes with Werner amines when in the form of its salt with the anion added in aqueous solution to step (I) of the FIGURE 1 method, and an anion having no stable existence as such in the aqueous medium can be added to step (III) of said FIGURE 1 method. The preferred metal salts are the hydroxides and carbonates of those divalent metals having incomplete 3d or 4d shells in their electronic configuration, and particularly the hydroxide and carbonate of nickel. Where nickelous hydroxide, or other equivalent metal hydroxide, is employed in place of the nickel carbonate in the FIGURE 1 method, the step (IV) refluxing operation can be omitted since in that event no $CO_2$ will be liberated in the reaction solution. Any other Werner amine can of course be employed in place of the 4-methylpyridine in step (V) of the FIGURE 1 method so long as it results in the formation of a suitable Werner complex.

As pointed out in the description of FIGURE 1, less than the stoichiometric amount, based on the amount of ammonium salt present, of nickel carbonate is added to step (III) of the method. The reason for this is twofold. In the first place it is desirable that some of the ammonium salt, with which the metal salt reacts, remain in the primary solution as a water-soluble ammonium salt component, the presence of such a water-soluble ammonium salt being desirable for reasons given previously. Secondly, I have discovered that an excess of said ammonium salt is required in order to dissolve all of the metal salt added at this point.

It is within the scope of this invention to substitute an aqueous solution of ammonium hydroxide for the ethanolamine added to step (I) of FIGURE 1. Where this embodiment is practiced the FIGURE 1 flowsheet will be somewhat modified. Thus no reaction will take place in the step (I) mixing operation, and the resulting solution will be merely a solution of the added ammonium thiocyanate, or equivalent salt, in aqueous ammonium hydroxide. Since there is no reaction there is no necessity for the step (II) refluxing operation to eliminate excess ammonia. It should also be noted that where ammonium hydroxide is employed in place of ethanolamine or other substituted nitrogen base equivalent, clathration step (VI) of FIGURE 2 will, of necessity, be accomplished by the removal of ammonia from the solution, with or without a change of temperature, rather than by the mere lowering of temperature as is the case when a substituted ammonium base such as ethanolamine is employed. Likewise in the clathrate dissolving step (IX) of FIGURE 2, the dissolution will be effected by the addition of ammonia to the solution, with or without a change in temperature, rather than by a mere temperature elevation as is the case when ethanolamine is employed.

In preparing the Werner complex solutions according to the method of my invention, it is not necessary that the above-described sequence of steps be followed. All that is required is that the ingredients as described be brought together in such fashion that a Werner complex solution of the proper formulation is achieved. I have discovered, however, that for best results, particularly where an aqueous mixture of an alkanolamine is employed as the aqueous nitrogen base solution, the sequence of steps described above and illustrated in the examples to follow is recommended. The liquid proportions and salt concentrations involved will vary depending upon the particular ingredients used.

When utilizing aqueous ammonium thiocyanate and an alkanolamine as reactants in step (I) of the FIGURE 1 technique, there should preferably be an excess of the alkanolamine over its calculated stoichiometric quantity in order to prevent some decomposition of the resulting alkanolammonium thiocyanate. While I am not completely certain of the reasons for the instability of the alkanolammonium thiocyanate in the absence of an excess of the alkanolamine, it is my opinion that this is due to the instability of thiocyanic acid (which is known to polymerize upon standing). If this be the case, it will be apparent to those skilled in the art that the presence of excess alkanolamine in the solution during refluxing step (II) will suppress the tendency of the alkanolammonium thiocyanate to hydrolyze to free thiocyanic acid and hence preclude the possibility of polymerization of said thiocyanic acid. In any event, the loss of alkanolammonium thiocyanate through decomposition can be substantially prevented by employing an excess of the corresponding alkanolamine in the manner described.

However, it should be cautioned that too large of an excess of the alkanolamine should not be employed because the resulting highly alkaline mixture tends to resist solution of the metal hydroxide or carbonate subsequently added. I have discovered that where alkanolammonium thiocyanate solutions are prepared by the addition of aqueous ammonium thiocyanate to an alkanolamine as taught herein, best results are achieved when the ammonium thiocyanate is added as an aqueous solution of from about 35 weight percent to about 60 weight percent concentration and in equivalency ratio of from about 0.5 to about 0.9 of ammonium thiocyanate to the alkanolamine.

When practicing the FIGURE 1 technique, it is desirable but not essential to dissolve the nickelous carbonate, or equivalent metal salt, in step (III) at an elevated temperature such as, for example, at a temperature of about 100° C. Consequently, it is preferred to add the metal salt to the hot reflux solution from step (II) directly after the removal of ammonia therefrom without employing an intermediate cooling operation. The quantities of metal salt added to the ammonium salt solution can vary within wide limits depending upon the particular ingredients involved. However, while these quantities are not critical, I have found that best results can be achieved where nickelous carbonate is employed as the metal salt and an alkanolammonium thiocyanate as the ammonium salt, when the molar ratio of the former to the latter is from about 0.1 to about 0.3.

While it is not a critical aspect of my invention, I have observed that in making nickel-containing solutions such as that from step (IV) of FIGURE 1, a certain excess of the alkanolamine must be present in order to maintain the nickel completely soluble on prolonged standing at ambient temperatures. In this connection, I have discovered that a molar ratio of alkanolamine to $Ni^{++}$ of about 4 will suffice to maintain all of the nickel in solution under conditions of prolonged storage.

I have found that when the procedure and ingredients of FIGURE 1 are employed in the practice of my invention best results are obtained when the 4-methylpyridine is added in step (V) in such quantity as to assure a final solution containing from about 15 to about 40 percent nickel tetra-(4-methylpyridine)dithiocyanate.

The desired proportions of primary solvent ingredients for purposes of this invention will vary depending upon the particular system under consideration. However, where the primary solvent is a mixture of water, an alkanolamine, and an alkanolammonium thiocyanate, the proportions, while not critical, should preferably be from about 30 to about 60 percent water, from about 30 to about 50 percent alkanolamine, and from 10 to about 30 percent alkanolammonium thiocyanate.

To contribute to a better understanding of this invention, the following examples are presented. It should be understood, however, that these examples are presented merely as a means of illustration and that the invention is not limited to the particular embodiments and conditions described therein.

EXAMPLE I

*Preparation of a Solution of Nickelous Thiocyanate in a Primary Solvent*

To a one-liter 3-necked flask equipped with a stirrer, thermometer and reflux condenser (attached via a rubber tube to a graduated cylinder containing 900 ml. $H_2O$) was added 370 g. of 53.5 percent aqueous $NH_4SCN$ solution (2.60 m., 197.9 g. $NH_4SCN$) and 246 g. (4.03 m.) of ethanolamine. The mixture was heated to reflux and reflux continued until evolution of ammonia essentially ceased (total reflux period was 33 min. at 112° C.). Titration of an aliquot from the ammonia receiver showed that 99.2 percent of the theoretical quantity of ammonia had been removed.

The ethanolammonium thiocyanate solution was cooled to 30° C., treated with 58.5 g. (0.6 m.) of Ni(OH)$_2$·¼ H$_2$O, then heated to 100° C. for 10 min. with stirring.

The mixture obtained was a dark blue solution that contained a trace of undissolved nickel hydroxide. Two weight percent Filter-Cel, a diatomaceous earth powder, was added to the mixture and it was then filtered by means of a Buchner funnel employing filter paper. The filtrate was a clear deep blue solution of nickelous thiocyanate in the primary solvent, stable to storage at ambient temperatures and having the following composition:

| | M. |
|---|---|
| Ni(SCN)$_2$ | 0.6 |
| Ethanolammonium thiocyanate | 1.4 |
| Ethanolamine | 1.63 |
| Water | 10.90 |

The filtrate of this example was a concentrate containing the proper ratio of Ni(SCN)$_2$ to ethanolammonium thiocyanate for my preferred Werner complex solution but less than the total amounts of water and ethanolamine requisite to that solution.

EXAMPLE II

This example describes the preparation of a Werner complex solution from the Example I concentrate and the separation of a xylene mixture therewith by clathration.

To a 300 ml. 3-necked flask equipped with a stirrer, thermometer and condenser was added 68 g. (0.064 g.-atom Ni$^{++}$) of the nickel thiocyanate concentrate produced in Example I, together with 22.7 ml. ethanolamine, 29.0 ml. water and 24.0 g. (0.256 m.) of 4-methylpyridine. Addition of the 4-methylpyridine resulted in precipitation of a blue Werner complex solid. The mixture was heated to solution (69° C.) then 23 ml. of feed xylene added. The mixture was stirred and cooled to 5° C., held at 5° C. for 10 minutes, then filtered. The filter cake was washed with 45 ml. of isooctane.

The filter cake washings were combined with the filtrate and the resulting mixture was allowed to form two phases, a hydrocarbon phase and an aqueous one. The hydrocarbon phase was separated and acid washed to remove 4-methylpyridine and analyzed for xylene isomer distribution. The solid was decomposed in dilute hydrochloric acid and the released hydrocarbon phase was separated and analyzed for xylene isomer distribution. The analytical data are shown below:

Table I

| | Analyses | | | | Recovery [a] | |
|---|---|---|---|---|---|---|
| | P-xylene | M-xylene | O-xylene | Ethylbenzene | P-xylene | M-xylene |
| Feed | 14.8 | 81.2 | 0.6 | 3.4 | | |
| Crystals | 63.0 | 30.6 | 0.3 | 6.1 | 95.6 | 9.1 |
| Filtrate | 0.9 | 95.8 | 0.8 | 2.5 | 4.4 | 90.9 |

[a] Vol. percent isomer found in that phase. Handling losses were distributed equally between the two streams produced.

The data presented in the above table show that 95.6 percent of the entering p-xylene was recovered as 63 percent pure p-xylene and that 90.9 percent of the entering m-xylene was recovered as 95.8 percent pure m-xylene. These results are superior to those realized under the same conditions employing pre-formed solid Werner complex.

The Werner complex solution of this example was characterized as follows:

Solvent composition:

| Component: | Weight percent |
|---|---|
| Water | 45 |
| Ethanolamine | 38 |
| Ethanolammonium thiocyanate | 17 |
| | 100 |

Solvent/Ni(4MP)$_4$(SCN)$_2$ (wt. ratio): 3.0.

The weight ratio of Ni(4MP)$_4$(SCN)$_2$ to p-xylene for the clathration treatment of this example was 12 and the separation factor α was calculated to be 224. The value of the separation factor, as those skilled in the art appreciate, is a measure of separation efficiency, the higher the value the greater the efficiency. The separation factor is similar to a distillation alpha, its value being derived in the following manner:

$$\frac{\text{p-xylene in clathrate crystals/p-xylene in filtrate}}{\text{m-xylene in clathrate crystals/m-xylene in filtrate}}$$

EXAMPLE III

In this example a Werner complex solution was prepared by the previously described method in which the Werner complex is separately synthesized and then added to the primary solvent. Nickelous sulfate and ammonium thiocyanate were dissolved in water and 4-methylpyridine was added thereto to precipitate the Werner complex; Ni(4MP)$_4$(SCN)$_2$. The solid material was separated from the resulting slurry as a hydrous solid of approximately 30 percent by weight water and air dried for several hours at ambient temperature in finely divided condition.

The air-dried Ni(4MP)$_4$(SCN)$_2$ was dissolved, with the aid of heat, in a quantity of separately prepared primary solvent. The ingredient quantities were adjusted so as to yield a Werner complex solution having a solvent/Ni(4MP)$_4$(SCN)$_2$ weight ratio of 3.0 and a solvent composition as follows:

| Component: | Weight percent |
|---|---|
| Water | 48.5 |
| Ethanolamine | 33.7 |
| Ethanolammonium thiocyanate | 17.8 |

A quantity of xylene feed mixture identical to that clathrated in Example II was clathrated in the same manner with the Werner complex solution of this example. The same proportion of feed was employed here as in Example II, i.e., an amount corresponding to a weight ratio of Ni(4MP)$_4$(SCN)$_2$ to p-xylene of 12. The results of the clathration are tabulated below:

Table II

| | Analyses | | | | Recovery [a] | |
|---|---|---|---|---|---|---|
| | P-xylene | M-xylene | O-xylene | Ethylbenzene | P-xylene | M-xylene |
| Feed | 14.8 | 81.2 | 0.6 | 3.4 | | |
| Crystals | 49.4 | 44.8 | 0.3 | 5.5 | 95.1 | 16.1 |
| Filtrate | 1.0 | 96.2 | 0.6 | 2.2 | 4.9 | 83.9 |

[a] Vol. percent isomer found in that phase. Handling losses were distributed equally between the two streams produced.

The separation factor α for this example was found to be 101.

A comparison of the results of this example with those of Example II clearly points out the superiority of my new method over the pre-existing method for the preparation of Werner complex solutions.

Thus in Example II, 95.6% of the entering p-xylene was recovered as 63% pure p-xylene. By comparison, in the present example, although the recovery was fairly high, the purity of the product was only 49.4%. With respect to the m-xylene, it will be noted that whereas the purity of product is roughly the same in Example III as in Example II, the yield is only 83.9% in Example III by comparison with a yield of 90.9% in Example II. Also to be noted is the fact that the value of α in Example II was over twice that in this example.

EXAMPLE IV

This example describes the preparation of a Werner complex solution of the same composition as that prepared in Example II, utilizing nickelous carbonate as the source of nickel for the Werner complex.

To a one-liter 3-necked flask equipped with a stirrer, thermometer and reflux condenser (attached via a rubber tube to a graduated cylinder containing 900 ml. H₂O) was added 370 g. of 53.5 percent aqueous NH₄SCN solution (2.60 m., 197.9 g. NH₄SCN) and 246 g. (4.03 m.) of ethanolamine. The mixture was heated to reflux and reflux continued until evolution of ammonia essentially ceased (total reflux period was 33 min. at 112° C.). Titration of an aliquot from the ammonia receiver showed that 99.2 percent of the theoretical quantity of ammonia had been removed.

The ethanolammonium thiocyanate solution was cooled to 30° C., treated with 71.1 g. (0.6 m.) of nickelous carbonate, then heated to reflux and reflux continued until evolution of carbon dioxide essentially ceased (total reflux period was 10 minutes at 112° C.).

The mixture obtained contained traces of solid matter and two weight percent Filter-Cel, a diatomaceous earth powder, was added thereto and it was then filtered by means of a Buchner funnel employing filter paper. The filtrate was a clear deep blue solution of nickelous thiocyanate in the primary solvent, stable to storage at ambient temperatures and containing as ingredients, besides the nickelous thiocyanate, ethanolammonium thiocyanate, ethanolamine and water.

To a 300 ml. 3-nicked flask equipped with a stirrer, thermometer and condenser was added 68 g. of the aforesaid solution, 22.7 ml. of ethanolamine, 29.0 ml. of water and 24.0 g. (0.256 m.) of 4-methylpyridine. This resulted in a Werner complex solution of nickel tetra(4-methylpyridine)dithiocyanate in a primary solvent consisting of 45% water, 38% ethanolamine and 17% ethanolammonium thiocyanate. The concentration of Werner complex in the solution was 25% corresponding to a primary solvent/Werner complex weight ratio of 3.0. Using this solution to separate a mixture of xylenes such as that employed in Example II results in clathration separation results substantially equivalent to those set forth in Table I.

Following are additional examples of the preparation and utilization of various Werner complex solutions according to methods taught herein.

EXAMPLE V

A quantity of 35 percent aqueous ammonium cyanide solution containing 2.6 m. of ammonium cyanide is mixed with 5.2 m. of 2-amino-2-methyl-1-propanol. Upon admixture of the two liquids the following reaction takes place in the resulting solution:

The reaction mixture, now containing water, 2-amino-2-methyl-1-propanolammonium cyanide and ammonia is refluxed to expel the ammonia. To the refluxed mixture free of ammonia there is added 0.7 m. of manganous carbonate which stoichiometrically reacts with a portion of the 2-amino-2-methyl-1-propanolammonium cyanide to yield a solution of 0.7 m. of Mn(CN)₂ and 1.2 m. of 2-amino-2-methyl-1-propanolammonium cyanide in a 2-amino-2-methyl-1-propanol, water and carbon dioxide solution. The solution is refluxed to expel CO₂ and then either stored until needed for conversion t oa Werner complex solution or converted immediately to such a solution in the manner described below.

To the aforesaid solution is added 2.8 m. of isoquinoline, together with sufficient water and 2-amino-2-methyl-1-propanol to yield a 35 percent solution of Mn(isoquinoline)₄(CN)₂ in a primary solvent of the following composition:

| Component: | Weight percent |
|---|---|
| Water | 46 |
| 2-amino-2-methyl-1-propanol | 40 |
| 2 - amino - 2 - methyl - 1 - propanolammonium cyanide | 14 |
| | 100 |

A mixture of m-cymene and mesitylene is subjected to selective clathration treatment with the above-described Werner complex solution at a solvent/Werner complex weight ratio of 3.0 as a result of which m-cymene is separated from mesitylene, most of the former being recovered as a raffinate.

EXAMPLE VI

A quantity of 55% aqueous ammonium acetate solution containing 3 mols of ammonium acetate is mixed with 3.5 mols of 2-amino-n-butanol; upon admixture of the two liquids the following reaction takes place in the resulting solution:

The reaction mixture, now containing water, 2-amino-1-butanolammonium acetate and ammonia is refluxed to expel the ammonia. To the refluxed mixture, free of ammonia, there is added 0.9 m. of cobaltous hydroxide which stoichiometrically reacts with a portion of the 2-amino-1-butanolammonium acetate to yield a solution of 0.9 m. of cobaltous acetate and 1.2 m. of 2-amino-1-butanolammonium acetate in a 2-amino-n-butanol and water mixture. The solution is either stored until needed for conversion to a Werner complex solution or converted immediately to such a solution in the manner described below.

To the aforesaid solution is added 3.6 m. of 4-ethylpyridine together with sufficient water and 2-amino-n-butanol to yield a 20% solution of $$Co(4\text{-ethylpyridine})_4(CH_3CO_2)_2$$

in a primary solvent of the following composition:

| Component: | Weight percent |
|---|---|
| Water | 50.0 |
| 2-amino-n-butanol | 38.8 |
| 2-amino-1-butanolammonium acetate | 11.2 |
| | 100.0 |

A mixture of o-ethyl toluene and p-ethyl toluene is subjected to selective clathration treatment with the above-described Werner complex solution, at a solvent/Werner complex weight ratio of 3 as a result of which p-ethyl toluene is separated from o-ethyl toluene, most of the former being recovered in the extract product and most of the latter being recovered as a raffinate.

EXAMPLE VII

A quantity of 45% aqueous ammonium cyanate solution containing 2.6 m. of ammonium cyanate is mixed with 4 m. of 2-(methylamino)ethanol. Upon admixture of the two liquids the following reaction takes place in the resulting solution:

The reaction mixture, now containing water, 2-(methylamino) ethanolammonium cyanate and ammonia is refluxed to expel the ammonia. To the refluxed mixture free of ammonia there is added 1 m. of ferrous carbonate which stoichiometrically reacts with a portion of the 2-(methylamino) ethanolammonium cyanate to yield a solution of 1 m. of ferrous cyanate and 0.6 m. of 2-(methylamino) ethanolammonium cyanate in a 2-methylamino) ethanol, water and carbon dioxide solution. The solution is refluxed to expel $CO_2$ and then either stored until needed for conversion to a Werner complex solution or converted immediately to such a solution in the manner described below.

To the aforesaid solution is added 4 m. of pyridine, together with sufficient water and 2-(methylamino) ethanol to yield 20% solution of $Fe(pyridine)_4(CNO)_3$ in a primary solvent of the following composition:

| Component: | Weight percent |
|---|---|
| Water | 76.6 |
| 2-(methylamino) ethanol | 20.0 |
| 2-(methylamino) ethanolammonium cyanate | 3.4 |
| | 100.0 |

A mixture of biphenyl and diphenyl methane is subjected to selective clathration treatment with the above-described Werner complex solution at a solvent/Werner complex weight ratio of 4 as a result of which biphenyl is separated from diphenylmethane, most of the former being recovered in the extract product and most of the latter being recovered as a raffinate.

EXAMPLE VIII

A quantity of 50% aqueous ammonium thiocyanate solution containing 2.6 mols of ammonium thiocyanate is mixed with 2.6 m. of ammonium hydroxide in a 50% solution. No reaction takes place upon mixture of the two liquids and the resulting solution is a mixture of 2.6 m. of ammonium thiocyanate and 2.6 m. of ammonium hydroxide in an aqueous solution.

To the mixture there is added 0.5 m. of platinous hydroxide which stoichiometrically reacts with a portion of the ammonium thiocyanate to yield a solution of 0.5 m. of platinous thiocyanate and 1.6 m. of ammonium thiocyanate in an ammonium hydroxide solution. The solution is either stored until needed for conversion to a Werner complex solution or converted immediately to such a solution in the manner described below. To the aforesaid solution is added 2 m. of 4-methoxy-3-ethyl-pyridine, together with sufficient aqueous ammonium hydroxide solution to yield a 30% solution of $Pt(4-methoxy, 3-ethyl pyridine)_4(SCN)_2$ in a primary solvent of the following composition:

| Component: | Weight percent |
|---|---|
| Water | 55.6 |
| Ammonium hydroxide | 30.0 |
| Ammonium thiocyanate | 14.4 |
| | 100.0 |

A mixture of tetralin and naphthalene is subjected to selective clathration treatment with the above-described Werner complex solution at a solvent/Werner complex weight ratio of 3 as a result of which naphthalene is separated from tetralin, most of the former being recovered in the extract product and most of the latter being recovered as a raffinate.

EXAMPLE IX

A quantity of 45% aqueous ethylammonium thiocyanate solution containing 2.6 m. of ethylammonium thiocyanate is mixed with 2 m. of n-propylamine. The resulting mixture contains water, n-propylamine and ethylammonium thiocyanate. To this mixture there is added 0.4 m. of palladium hydroxide which stoichiometrically reacts with a portion of the ethylammonium thiocyanate to yield a solution of 0.4 m. of palladium thiocyanate and 1.8 m. of ethylammonium thiocyanate in an aqueous solution of n-propylamine and ethylamine. The solution is either stored until needed for conversion to a Werner complex solution or converted immediately to such a solution in the manner described below. To the aforesaid solution is added 1.6 m. of 1-hexylamine, together with sufficient water and n-propylamine to yield a 20% solution of $palladium(1-hexylamine)_4(SCN)_2$ in a primary solvent of the following composition:

| Component: | Weight percent |
|---|---|
| Water | 75.0 |
| n-propylamine+ethanolamine | 15.2 |
| Ethylammonium citrate | 9.8 |
| | 100.0 |

EXAMPLE X

A quantity of 50% aqueous ammonium chloride solution containing 2.6 m. of ammonium chloride is mixed with 4.5 m. of diethanolamine. Upon admixture of the two liquids the following reaction takes place in the resulting solution:

The reaction mixture, now containing water, diethanolamine, diethanolammonium chloride and ammonia is refluxed to expel the ammonia. To the reflux mixture free of ammonia there is added 0.6 m. of nickelous carbonate which stoichiometrically reacts with a portion of the diethanolammonium chloride to yield a solution of 0.6 m. of nickelous chloride and 1.4 m. of diethanolammonium chloride in a diethanolamine, water and carbon dioxide solution. The solution is refluxed to expel carbon dioxide and then either stored until needed for conversion to a Werner complex solution or converted immediately to such a solution in the manner described below.

To the aforesaid solution is added 2.4 m. of 4-chloro, 3-methyl pyridine, together with sufficient water and diethanolamine to yield a 25% solution of $Ni(4-chloro, 3-methylpyridine)_4-Cl_2$ in a primary solvent of the following composition:

| Component: | Weight percent |
|---|---|
| Water | 57.2 |
| Diethanolamine | 30.0 |
| Diethanolammonium chloride | 12.8 |
| | 100.0 |

A mixture of durene and isodurene is subjected to selective clathration treatment with the above-described Werner complex solution at a solvent/Werner complex weight ratio of 3 as a result of which durene is separated from isodurene, most of the former being recovered in the extract product and most of the latter being recovered as a raffinate.

It will be apparent to those skilled in the art that a great number and variety of Werner complex solutions within the scope of this invention can be prepared by carrying out the method taught herein using different combinations of the various solvents, salts and bases applicable for the purpose.

I claim:

1. A method for resolving a xylene mixture including p-xylene, which comprises (1) forming a Werner complex solution of nickel tetra(4-methylpyridine)dithiocyanate in a primary solvent consisting of an aqueous ethanolamine solution, having a minor proportion of ethanolammonium thiocyanate dissolved therein, by mixing aqueous ammonium thiocyanate solution of from about 35 to about 60 percent concentration with ethanolamine in an equavalency ratio of from about 0.5 to about 0.9 of the former to the latter, heat treating the resulting mixture to drive ammonia therefrom, adding from about 0.1 to about 0.3 mols of nickelous carbonate per mol of ethanolammonium thiocyanate therein to the mixture, heat treating the mixture to effect relatively rapid and substantially complete reaction between the nickelous carbonate and ethanolammonium thiocyanate, dissolving 4-methylpyridine in the heat-treated mixture and adding additional water and ethanolamine thereto, the quantities of 4-methylpyridine, water and ethanolamine added being such as to assure a solution of from about 15 to about 40 percent nickel tetra-(4-methylpyridine)dithiocyanate in a primary solvent consisting of from about 30 to about 60 percent water, from about 30 to about 50 percent ethanolamine and from about 10 to about 30 percent ethanolammonium thiocyanate; (2) admixing the Werner complex solution from step (1) with said xylene mixture while cooling the mixture to effect precipitation of a solid clathrate of p-xylene and nickel tetra(4-methylpyridine)dithiocyanate; (3) separating the solid clathrate from the mixture leaving liquid behind; (4) separating said liquid into a raffinate phase and an aqueous primary solvent phase; (5) re-dissolving said solid clathrate in the aqueous primary solvent phase from step (4) at a temperature from about 25° to about 75° C. higher than the clathration temperature in step (2); and (6) separating the mixture into a Werner complex solution phase and an extract phase comprising a xylene mixture enriched in p-xylene.

2. A method of preparing a solution of a Werner complex dissolved in a primary solvent, said solvent comprising an aqueous nitrogen base solution having dissolved therein a minor proportion of a water-soluble ammonium salt, comprising mixing a salt of a metal having an atomic number above 12 and an anion selected from the group consisting of hydroxide and carbonate with a stoichiometric excess of a solution of an ammonium salt of an anion capable of forming a salt with a metal having an atomic number above 12, which latter salt is capable of forming relatively water-insoluble Werner complexes with Werner amines, in an aqueous nitrogen base solution, and adding a quantity of a Werner amine to the resulting solution.

3. A method of preparing a solution of a Werner complex dissolved in a primary solvent, said solvent comprising an aqueous alkanolamine solution having dissolved therein a minor proportion of a water-soluble alkanolammonium salt, comprising mixing an aqueous solution of an ammonium salt of an anion capable of forming a salt with a metal having an atomic number above 12, which latter salt is capable of forming relatively water-insoluble Werner complexes with Werner amines, with a stoichiometric excess of alkanolamine, adding to the resulting solution less than a stoichiometric quantity of a salt of a metal having an atomic number above 12 and an anion selected from the group consisting of hydroxide and carbonate, and adding a quantity of a Werner amine to the solution.

4. A method of preparing a solution of a heterocyclic nitrogen base Werner complex dissolved in a primary solvent, said solvent comprising an aqueous alkanolamine solution having dissolved therein a minor proportion of a salt material selected from the group consisting of the thiocyanates, isothiocyanates, cyanates, isocyanates, cyanides and azides of the alkanolamines, and mixtures thereof, comprising mixing an aqueous solution of a salt material selected from the group consisting of ammonium thiocyanate, ammonium isothiocyanate, ammonium cyanate, ammonium isocyanate, ammonium cyanide, ammonium azide and mixtures thereof, with a stoichiometric excess of alkanolamine; adding less than the stoichiometric quantity of a material selected from the group consisting of the hydroxides and carbonates of manganese, iron, cobalt, and nickel, and mixtures thereof, to the resulting solution; and adding a quantity of a heterocyclic nitrogen base material selected from the group consisting of the pyridine ring compounds and mixtures thereof to the solution.

5. A method of preparing a Werner complex solution of nickel tetra(4-methylpyridine)dithiocyanate in a primary solvent, said solvent comprising an aqueous lower alkanolamine solution having dissolved therein a minor proportion of lower alkanolammonium thiocyanate, comprising mixing an aqueous solution of ammonium thiocyanate with a stoichiometric excess of lower alkanolamine, adding less than a stoichiometric quantity of nickelous hydride to the resulting solution, and adding a quantity of 4-methylpyridine to the resulting mixture.

6. A method of preparing a Werner complex solution of nickel tetra(4-methylpyridine)dithiocyanate in a primary solvent, said solvent comprising an aqueous lower alkanolamine solution having dissolved therein a minor proportion of lower alkanolammonium thiocyanate, comprising mixing an aqueous solution of ammonium thiocyanate with a stoichiometric excess of lower alkanolamine, adding less than a stoichiometric quantity of nickelous carbonate to the resulting solution, and adding a quantity of 4-methylpyridine to the resulting mixture.

7. The method of claim 6 wherein the lower alkanolamine is ethanolamine.

8. In a selective clathration process for the separation of a mixture of organic compounds where the components of said mixture differ in molecular configuration and where at least one component of said mixture is clathratable, wherein the feed mixture to be resolved is contacted with a solution of a Werner complex dissolved in a primary solvent comprising an aqueous nitrogen base solution having dissolved therein a minor proportion of a water soluble ammonium salt, and clathration is effected by altering the environment of the resulting mixture to effect precipitation of solid Werner complex clathrate, the improvement which comprises preparing the solution of said Werner complex in said primary solvent by mixing a salt of a metal having an atomic number above 12 and an anion selected from the group consisting of hydroxide and carbonate, with a stoichiometric excess of a solution of an ammonium salt of an anion capable of forming a salt with a metal having an atomic number above 12, which latter salt is capable of forming relatively water-insoluble Werner complexes with Werner amines, in an aqueous nitrogen base solution, and adding a quantity of a Werner amine to the resulting solution.

9. In a selective clathration process for the separation of a mixture of organic compounds where the components of said mixture differ in molecular configuration and where at least one component of said mixture is clathratable, wherein the feed mixture to be resolved is contacted with a solution of a Werner complex dissolved in a primary solvent comprising an aqueous alkanolamine solution having dissolved therein a minor proportion of a water soluble alkanolammonium salt and clathration is effected by cooling the resulting mixture to effect precipitation of solid Werner complex clathrate; the improvement which comprises preparing the solution of said Werner complex in said primary solvent by mixing an aqueous solution of an ammonium salt of an anion capable of forming a salt with a divalent metal having an incomplete $d$ shell, which latter salt is capable of forming relatively water-insoluble Werner complexes with Werner amines, with a stoichiometric excess of alkanolamine; adding less than a stoichiometric quantity of a salt of a divalent metal having an incomplete $d$ shell and an anion selected from the group consisting of hydroxide and carbonate to the resulting solution; and adding a quantity of a Werner amine to the solution.

10. In a selective clathration process for the separation of a mixture of organic compounds where the components of said mixture differ in molecular configuration and where at least one component of said mixture is clathratable, wherein the feed mixture to be resolved is contacted with a solution of a Werner complex dissolved in a primary solvent comprising an aqueous alkanolamine solution having dissolved therein a minor proportion of a salt material selected from the group consisting of the thiocyanates, isothiocyanates, cyanates, isocyanates, cyanides, and azides of the alkanolamines, and mixtures thereof, and clathration is effected by cooling the resulting mixture to effect precipitation of solid Werner complex clathrate; the improvement of which comprises preparing the solution of said Werner complex in said primary solvent by mixing an aqueous solution of a salt material selected from the group consisting of ammonium thiocyanate, ammonium isothiocyanate, ammonium cyanate, ammonium isocyanate, ammonium cyanide, ammonium azide, and mixtures thereof, with a stoichiometric excess of alkanolamine; adding less than a stoichiometric quantity of a material, selected from the group consisting of the hydroxides and carbonates of manganese, iron, cobalt and nickel, and mixtures thereof, to the resulting solution; and adding a quantity of a heterocyclic nitrogen base material selected from the group consisting of the pyridine ring compounds and mixtures thereof to the solution.

11. In a selective clathration process for the separation of a mixture of organic compounds where the components of said mixture differ in molecular configuration and where at least one component of said mixture is clathratable, wherein the feed mixture to be resolved is contacted with a solution of a lower 4-alkyl pyridine Werner complex of nickelous thiocyanate dissolved in a primary solvent comprising an aqueous lower alkanolamine solution having dissolved therein a minor proportion of lower alkanolammonium thiocyanate, and clathration is effected by cooling the resulting mixture to effect precipitation of Werner complex clathrate; the improvement which comprises preparing the solution of said Werner complex in said primary solvent by mixing an aqueous solution of ammonium thiocyanate with a stoichiometric excess of lower alkanolamine; adding less than a stoichiometric quantity of nickelous hydroxide to the resulting solution; and adding a quantity of a lower 4-alkyl pyridine to the solution.

12. In a selective clathration process for the separation of a mixture of organic compounds where the components of said mixture differ in molecular configuration and where at least one component of said mixture is clathratable, wherein the feed mixture to be resolved is contacted with a solution of a lower 4-alkyl pyridine Werner complex of nickelous thiocyanate dissolved in a primary solvent comprising an aqueous lower alkanolamine solution having dissolved therein a minor proportion of lower alkanolammonium thiocyanate, and clathration is effected by cooling the resulting mixture to effect precipitation of Werner complex clathrate; the improvement which comprises preparing the solution of said Werner complex in said primary solvent by mixing an aqueous solution of ammonium thiocyanate with a stoichiometric excess of lower alkanolamine; adding less than a stoichiometric quantity of nickelous carbonate to the resulting solution; and adding a quantity of a lower 4-alkyl pyridine to the solution.

13. A method for resolving a mixture of disubstituted benzene isomers including a para isomer which comprises (1) forming a Werner complex solution of nickel tetra 4-methylpyridine)dithiocyanate in a primary solvent comprising an aqueous lower alkanolamine solution having dissolved therein a minor proportion of lower alkanolammonium thiocyanate by mixing an aqueous solution of ammonium thiocyanate with a stoichiometric excess of lower alkanolamine, adding less than a stoichiometric quantity of nickelous hydroxide to the resulting solution, and adding a quantity of 4-methylpyridine to the solution; (2) admixing said solution of nickel tetra(4-methylpyridine)dithiocyanate in said primary solvent with said mixture of disubstituted benzene isomers; (3) cooling the resulting mixture to effect precipitation of a solid clathrate of tetra(4-methylpyridine)dithiocyanate with a portion of the mixture of disubstituted benzene isomers enriched in the para isomer; (4) separating unclathrated isomers from the resulting mixture; (5) redissolving said clathrate in the remaining aqueous lower alkanolamine solvent phase at a relatively high temperature thereby liberating said mixture of disubstituted benzene isomers enriched in the para isomers; and (6) separating the para isomer enriched disubstituted benzene mixture from the reconstituted Werner complex solution.

14. A method for resolving a mixture of disubstituted benzene isomers including a para isomer which comprises (1) forming a Werner complex solution of nickel (4-methylpyridine)dithiocyanate in a primary solvent comprising an aqueous lower alkanolamine solution having dissolved therein a minor proportion of lower alkanolammonium thiocyanate by mixing an aqueous solution of ammonium thiocyanate with a stoichiometric excess of lower alkanolamine, adding less than a stoichiometric quantity of nickelous carbonate to the resulting solution, and adding a quantity of 4-methylpyridine to the solution; (2) admixing said solution of nickel tetra(4-methylpyridine)dithiocyanate in said primary solvent with said mixture of disubstituted benzene isomers; (3) cooling the resulting mixture to effect precipitation of a solid clathrate of tetra(4-methylpyridine)dithiocyanate with a portion of the mixture of disubstituted benzene isomers enriched in the para isomer; (4) separating unclathrated isomers from the resulting mixture; (5) redissolving said clathrate in the remaining aqueous lower alkanolamine solvent phase at a relatively high temperature thereby liberating said mixture of disubstituted benzene isomers enriched in the para isomer; and (6) separating the para isomer eniched disubstituted benzene mixtue from the reconstituted Werner complex solution.

15. The method of claim 14 wherein said lower alkanolamine is ethanolamine.

16. A method for resolving a feed mixture of organic compounds where the components of said mixture differ in molecular configuration and where at least one component of said mixture is clathratable, which comprises (1) forming a Werner complex solution of nickel tetra(4-methylpyridine)dithiocyanate in a primary solvent comprising an aqueous lower alkanolamine solution having dissolved therein a minor proportion of lower alkanolammonium thiocyanate by mixing an aqueous solution of ammonium thiocyanate with a stoichiometric excess of lower alkanolamine, adding less than a stoichiometric quantity of nickelous carbonate to the resulting solution, and adding a quantity of 4-methylpyridine to the solution; (2) mixing the resulting solution with said feed mixture; (3) cooling the resulting mixture to effect precipitation of a solid clathrate of at least one component of said feed mixture with said Werner complex; (4) separating said solid clathrate from the liquid phase; (5) recovering the clathrated feed component from said clathrate; and (6) recovering the non-clathrated feed component from the liquid phase of step (4).

17. A method of preparing a solution which is convertible to a Werner complex solution by the addition of a Werner amine thereto comprising mixing a salt of a divalent metal having an incomplete $d$ shell and an anion selected from the group consisting of hydroxide and carbonate with a stoichiometric excess of a solution of an ammonium salt of an anion capable of forming a salt with a divalent metal having an incomplete $d$ shell, which latter salt is capable of forming relatively water-insoluble Werner complexes with Werner amines, in an aqueous nitrogen base solution.

18. A method of preparing a solution which is convertible to a Werner complex solution by the addition of a heterocyclic nitrogen base thereto comprising mixing an aqueous solution of ammonium thiocyanate with a stoichiometric excess of alkanolamine and adding less than the stoichiometric quantity of a material selected from the group consisting of the hydroxides and carbonates of manganese, iron, cobalt and nickel, and mixtures thereof, to the resulting solution.

19. As a new composition of matter, a solution prepared by mixing an aqueous solution of ammonium thiocyanate with a stoichiometric excess of alkanolamine and adding less than the stoichiometric quantity of a material selected from the group consisting of the hydroxides and carbonates of manganese, iron, cobalt and nickel, and mixtures thereof, to the resulting solution.

20. The method of claim 18 wherein the material selected from the group consisting of the hydroxides and carbonates of manganese, iron, cobalt and nickel is nickelous carbonate.

References Cited in the file of this patent
UNITED STATES PATENTS

| | | |
|---|---|---|
| 2,007,166 | Hund et al. | July 9, 1935 |
| 2,876,227 | Schaeffer | Mar. 3, 1959 |
| 2,905,684 | Schaeffer et al. | Sept. 22, 1959 |
| 2,905,730 | Ray et al. | Sept. 22, 1959 |
| 3,013,091 | Fleck et al. | Dec. 12, 1961 |
| 3,029,300 | Schaeffer | Apr. 10, 1962 |

OTHER REFERENCES

Schaeffer: The Chemist Analyst, vol. 41, No. 3, pp. 57 and 59, September 1952.

UNITED STATES PATENT OFFICE
CERTIFICATE OF CORRECTION

Patent No. 3,161,694

December 15, 1964

William D. Schaeffer

It is hereby certified that error appears in the above numbered patent requiring correction and that the said Letters Patent should read as corrected below.

Column 18, line 74, for "equavalency" read -- equivalency --; column 20, line 11, for "hydride" read -- hydroxide --; column 21, line 63, before "4-methylpyridine)" insert an opening parenthesis --; column 22, line 8, for "isomers" read -- isomer --.

Signed and sealed this 13th day of April 1965.

(SEAL)
Attest:

ERNEST W. SWIDER
Attesting Officer

EDWARD J. BRENNER
Commissioner of Patents